US012658039B2

(12) United States Patent
Moyer

(10) Patent No.: US 12,658,039 B2
(45) Date of Patent: *Jun. 16, 2026

(54) LED TRAFFIC LIGHT SYSTEM

(71) Applicant: Christopher S. Moyer, Louisville, KY (US)

(72) Inventor: Christopher S. Moyer, Louisville, KY (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/904,224

(22) Filed: Oct. 2, 2024

(65) Prior Publication Data

US 2025/0037579 A1 Jan. 30, 2025

Related U.S. Application Data

(63) Continuation-in-part of application No. 18/131,497, filed on Apr. 6, 2023, now Pat. No. 12,131,636.

(60) Provisional application No. 63/476,005, filed on Dec. 19, 2022.

(51) Int. Cl.

| | |
|---|---|
| ***G08G 1/095*** | (2006.01) |
| ***F21S 8/00*** | (2006.01) |
| ***H05B 45/20*** | (2020.01) |
| *F21Y 115/10* | (2016.01) |

(52) U.S. Cl.

CPC ................ *G08G 1/095* (2013.01); *F21S 8/00* (2013.01); *H05B 45/20* (2020.01); *F21Y 2115/10* (2016.08)

(58) Field of Classification Search

CPC . G08G 1/095; F21S 8/00; H05B 45/20; F21Y 2115/10

See application file for complete search history.

(56) References Cited

U.S. PATENT DOCUMENTS

| | | | | |
|---|---|---|---|---|
| 5,898,381 | A * | 4/1999 | Gartner | G08G 1/095 340/815.45 |
| 6,054,932 | A * | 4/2000 | Gartner | G08G 1/095 340/815.45 |
| 6,236,331 | B1 * | 5/2001 | Dussureault | H05B 45/58 340/916 |
| 6,762,689 | B2 * | 7/2004 | Dechape | G08G 1/095 40/550 |
| 6,809,655 | B1 * | 10/2004 | Colby | G08G 1/095 340/815.45 |
| 7,330,130 | B2 * | 2/2008 | Bolotin | G08G 1/096 340/925 |
| 9,488,354 | B2 * | 11/2016 | McClean | G09F 9/305 |
| 9,715,827 | B2 * | 7/2017 | Ng | G08G 1/0175 |
| 10,650,672 | B2 * | 5/2020 | Shuff | G08G 1/005 |
| 11,615,704 | B2 * | 3/2023 | Kijashka | G09F 13/0472 340/929 |
| 12,131,636 | B2 * | 10/2024 | Moyer | G08G 1/095 |

(Continued)

OTHER PUBLICATIONS

Extended European Search Report, mailed Jan. 22, 2024, European Application No. 23192525.6; Applicant: Moyer, Christopher S.

*Primary Examiner* — John A Tweel, Jr.

(74) *Attorney, Agent, or Firm* — Dentons Bingham Greenebaum LLP; Brian W. Chellgren; James C. Eaves, Jr.

(57) ABSTRACT

A LED Traffic Light to aid people who have issues with color blindness. For the main LED traffic light, there is a solid matrix of LEDs on the complete face facing traffic. The light pattern displayed will indicate stop, caution, or go and the light patterns shown will differ for stop, caution, and go. Auxiliary lights can be employed with the main LED traffic light to indicate whether or not turns can be made.

7 Claims, 3 Drawing Sheets

(56) References Cited

U.S. PATENT DOCUMENTS

| | | | | |
|---|---|---|---|---|
| 2002/0027510 | A1 | 3/2002 | Jones et al. | |
| 2010/0225502 | A1* | 9/2010 | Elsheemy .............. | G08G 1/095 345/83 |
| 2020/0111354 | A1 | 4/2020 | Hofman | |

* cited by examiner

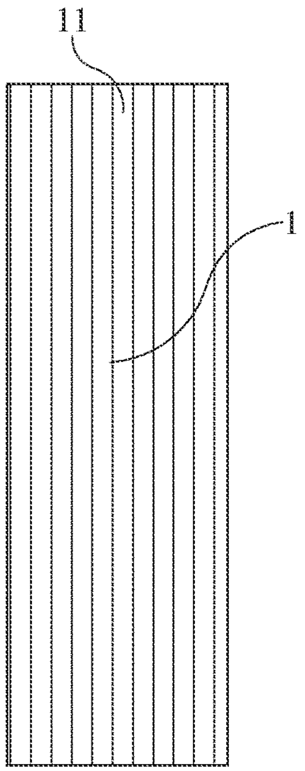
FIG. 1A
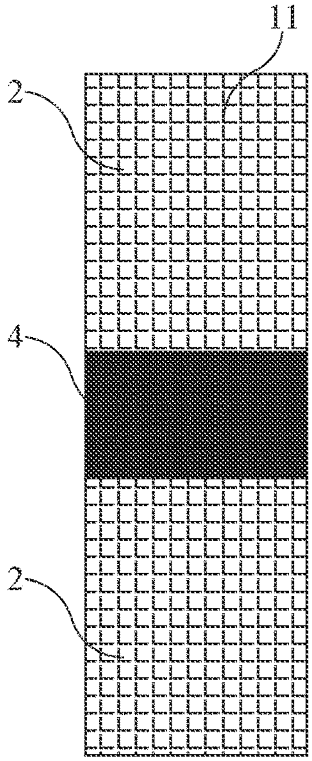
FIG. 1B
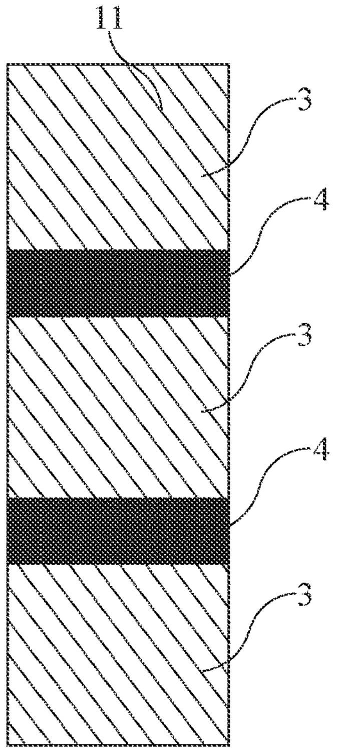
FIG. 1C
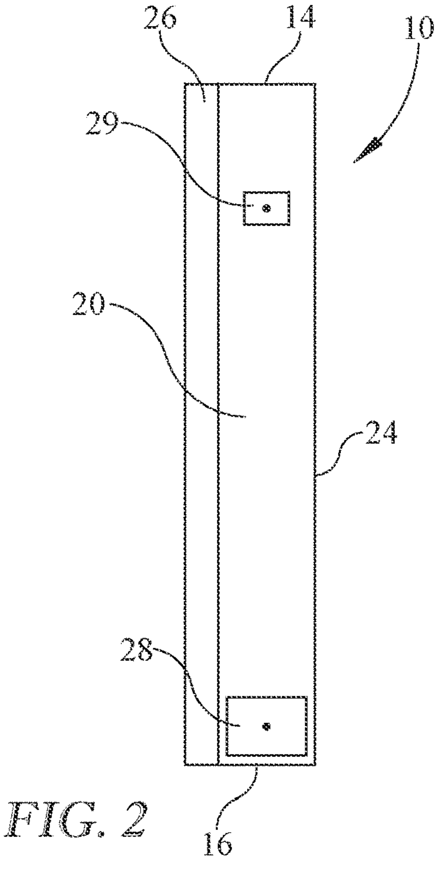
FIG. 2
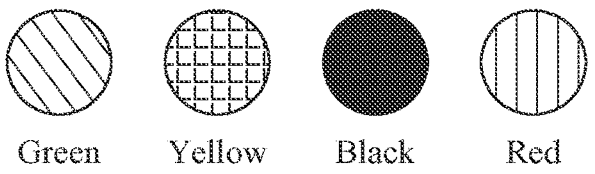

LED TRAFFIC LIGHT SYSTEM

CROSS REFERENCE TO RELATED APPLICATIONS

This application claims the benefit of priority as a continuation-in-part of U.S. patent application Ser. No. 18/131,497, filed Apr. 6, 2023, which claims the benefit of priority to U.S. Provisional Application No. 63/476,005, filed Dec. 19, 2022, each of which is incorporated herein by reference.

FIELD OF THE INVENTION

The present invention relates to a LED Traffic Light System to aid people who have issues with color blindness. For the main LED traffic light, there is a solid matrix of LEDs on the complete face drivers or pedestrians will see. The light pattern displayed will indicate stop, caution, or go. Auxiliary LED traffic lights can be employed with the main LED traffic light to indicate whether or not turns can be made. These lights, having a larger display than known traffic lights or signals, will also provide enhanced visibility to all viewing.

BACKGROUND OF THE INVENTION

Traffic lights vary around the world. Most generally, they have three lights, typically a first light meaning go, a second light meaning caution, and a third light meaning stop. The lights may be a first color, a second color, or a third color. At traffic intersections, whether crossing streets, T-junctions, or roundabouts, for example, multiple traffic lights are usually programmed or set to work together to manage traffic flow. For example, when a traffic light facing one direction of travel is a color indicating go, a traffic light facing another direction of travel is usually a color indicating stop. As the light changes from a color indicating go, to a color indicating caution, and then to a color indicating stop, the light facing the other direction will often stay a color indicating stop as the other light changes from the color indicating go, to the color indicating caution, to the color indicating stop. There may even be a few second period when both lights are the color indicating stop before the light facing the other direction turns from the color indicating stop to the color indicating go. Depending on the traffic intersections, cycle times for the colors indicating go, caution, and stop can be varied during the day to adjust for the amount of traffic. Also, lights in one intersection can be synchronized with lights in other intersections to improve traffic flow. In addition to the first color, second color, third color traffic light, auxiliary lights can be employed to indicate whether or not turns can be made, and, if so, when.

People who are color blind may or may not be able to tell which of the first color, second color, or third color light is on. If they can, they may not be able to determine the color of the light. With the different possible locations or orientations of traffic lights, this can make it difficult for a color blind person to safely travel. The present invention helps a color blind person safely travel.

SUMMARY

The instant invention relates to a LED Traffic Light System to aid people who have issues with color blindness, as, for the main LED traffic light, there is a solid matrix of LEDs on the complete face that drivers or pedestrians approaching will see. This provides the viewer a much larger area to see whether the stop, caution, or go signal is lit. While a stop, caution, or go light pattern is displayed on the LEDs, as is explained herein, a different light pattern is displayed to indicate stop, caution, or go. For a stop indication, the entire LED face is illuminated a first color. For a caution indication, the entire LED face has two areas illuminated a second color and these two areas are separated by a middle area lit with a fourth color. For a go indication, the entire LED face has three colored areas illuminated a third color and these three areas are separated by two areas lit with the fourth color. An alternative to the two areas lit with the fourth color is also taught.

For the auxiliary LED traffic lights employed with the main LED traffic light used to indicate whether or not turns can be made, different turn area patterns are displayed on another LED face to indicate no turn permitted (a first color arrow), turn with caution (second color arrows), or turn permitted (third color arrows). An auxiliary light for left turns may be employed to the left of a LED traffic light and an auxiliary light for right turns may be employed to the right of a LED traffic light. Alternatively, auxiliary lights to indicate turns may be located distant from the LED traffic light; for example, at the right side of the road for right turn control. The LED face of the auxiliary turn light will generally have a fourth color background. To indicate no turn permitted, a single first color turn arrow can be illuminated on the fourth color background, for example, near the top of the light. To indicate turn permitted with caution, a pair of second color turn arrows can be illuminated on the fourth color background, for example, one near the top of the light and one toward the bottom of the light. To indicate turn permitted, three third color turn arrows can be illuminated on the fourth color background, for example, one near the top of the light, one toward the bottom of the light, and one between those two arrows. Symbols other than arrows can be employed. For example, for a first color arrow indicating no turn permitted, the first color arrow could have a slanted line crossing it.

More particularly, the present invention is for a LED traffic light system having a first LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for a driver to take from viewing the LED matrix.

Also, a first indication of what action is permitted is to activate all of the LEDs in the LED matrix to display a first color; where a second indication of what action is permitted is to activate LEDs in the upper and lower portions of the LED matrix to display a second color, there being an area in the center of the LED matrix where the LEDs are unlit thereby showing a fourth color area between the second color upper and lower portions; and where a third indication of what action is permitted is to activate LEDs in the upper, middle, and lower portions of the LED matrix to display a third color, there being an area between each of the third color upper, middle, and lower portions where the LEDs therein are unlit, that area showing as a fourth color area.

Also, the first color area in the first indication, the second color areas in the second indication, and the third color areas in the third indication will preferably each appear with a rectangular shape, and the fourth color area between the second color areas in the second indication and the fourth color areas between the third color areas in the third indication appear with a rectangular shape. Alternatively, the first color area in the first indication, the second color areas in the second indication, and the upper and lower third color areas in the third indication may each appear with a rectangular shape and the middle third color area in the third indication appears with a circular shape, and the fourth color area between the second color areas in the second indication appear with a rectangular shape.

When the LED traffic light is used as an auxiliary light to indicate turn information, a first indication of what action is permitted is to activate LEDs toward the top of the LED matrix to display a single arrow in a first color, the first color arrow indicating no turn permitted in the direction the arrow points, the remainder of the LEDs in the LED matrix being unlit; a second indication of what action is permitted is to activate LEDs toward the top off the LED matrix to display two arrows in a second color, the second color arrows indicating turn permitted using caution in the direction the arrows point, the remainder of the LEDs in the LED matrix being unlit; and a third indication of what action is permitted is to activate LEDs toward the top, middle, and bottom of the LED matrix to display three arrows in a third color, the third color arrows indicating turn permitted in the direction the arrows point, the remainder of the LEDs in the LED matrix being unlit.

Even further, with the LED traffic light, the programmable circuit board connected to a power source can be connected to power external to the housing or to battery back-up power should external power fail.

Also, the LED traffic light system can include a second LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for the driver to take from viewing the LED matrix, where a first indication of what action is permitted displayed on the LED matrix of the second LED traffic light is to activate LEDs toward the top of the LED matrix to display a single arrow in a first color, the first color arrow indicating no turn permitted in the direction the arrow points, the remainder of the LEDs in the LED matrix being unlit; where a second indication of what action is permitted is to activate LEDs toward the top of the LED matrix to display two arrows in a second color, the second color arrows indicating turn permitted using caution in the direction the arrows point, the remainder of the LEDs in the LED matrix being unlit; and where a third indication of what action is permitted is to activate LEDs toward the top, middle, and bottom of the LED matrix to display three arrows in a third color, the third color arrows indicating turn permitted in the direction the arrows point, the remainder of the LEDs in the LED matrix being unlit.

When first and second LED traffic lights are employed, the indication of what action is permitted for the driver to take from viewing the LED matrix displayed on the first LED traffic light and the indication of what action is permitted for a driver to take from viewing the LED matrix displayed on the second LED traffic light are synchronized.

The above summary is from the standpoint of one driver approaching an intersection and the traffic lights that driver might see. In a standard 4-way intersection, there will typically be one or more traffic lights at all the approaches to the intersection. These may all be traffic lights as disclosed herein and those multiple traffic lights will be synchronized to control access to the intersection from the various approaches.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

FIG. 1A depicts the face of the main LED traffic light indicating a first color stop light. In the embodiment shown in FIG. 1A, the first color is red.

FIG. 1B depicts the face of the main LED traffic light indicating a second color caution light. In the embodiment shown in FIG. 1B, the second color is yellow.

FIG. 1C depicts the face of the main LED traffic light indicating a third color go light. In the embodiment shown in FIG. 1C, the third color is green.

FIG. 2 is a right side view of the main LED traffic light.

DETAILED DESCRIPTION OF THE PREFERRED EMBODIMENTS

Figure 3:
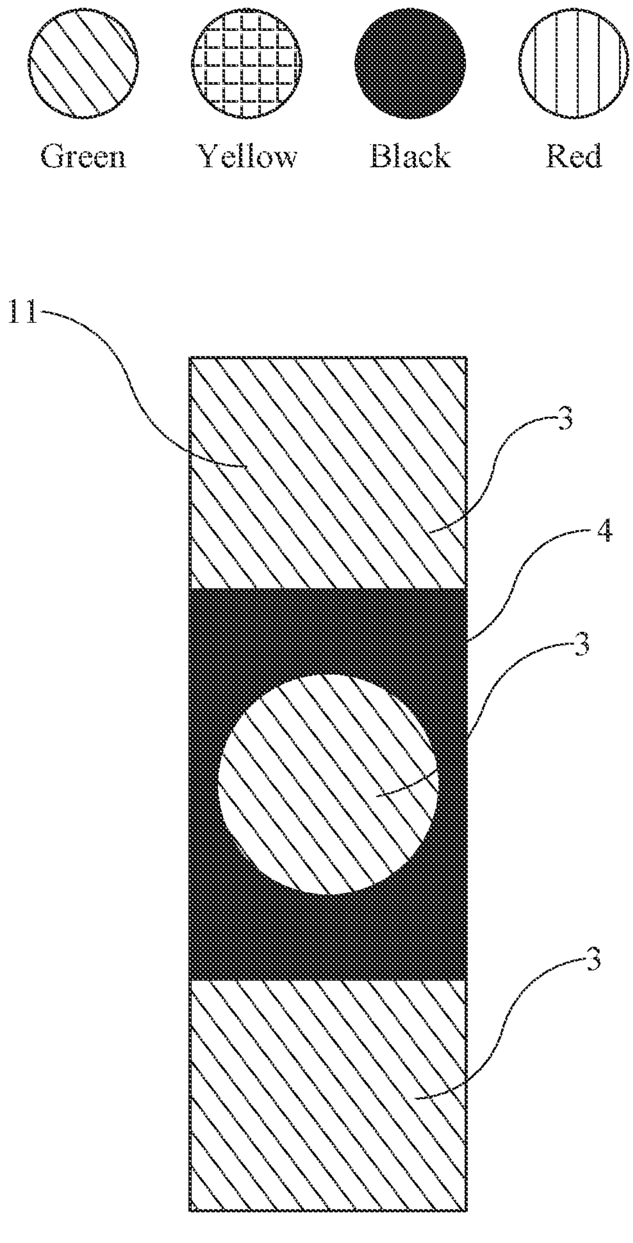
FIG. 3 depicts the face of an alternate main LED traffic light indicating a third color go light. In the embodiment shown in FIG. 3, the third color is green.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

The following numbers are used in the drawings: 1—a first color; 2—a second color; 3—a third color; 4—a fourth color; 10—LED traffic light; 11—LED face; 12—housing; 14—top; 16—bottom; 18—left side; 20—right side; 24—back; 26—fairing; 28—battery back-up access; and 29—circuit board access. In addition to identifying a first color, second color, third color, and fourth color with the numbers 1, 2, 3, and 4 respectively, the symbols for the colors shown in the depicted embodiments, as detailed in MPEP section 608.02 IX, are also used to show the color patterns on the LED face 11.

Again, the present invention relates to a LED Traffic Light System to aid people who have issues with color blindness. For the main LED traffic light 10, there is a solid matrix of LEDs on the complete face 11 facing traffic. The light pattern displayed will indicate a first color 1/stop, a second color 2/caution, or a third color 3/go. A fourth color 4 is used to make some of the light patterns displayed unique. Auxiliary LED traffic lights 10 can be employed with the main LED traffic light 10 to indicate whether or not turns can be made.

With reference to FIGS. 1A, 1B, 1C, and 2, a LED traffic signal 10 is shown with a housing 12 having the shape of a rectangular parallelepiped. FIGS. 1A, 1B, and 1C show the solid LED matrix on the complete front face 11 of the housing 12 which will face traffic. As shown, the edge from top to bottom could have a length of about 42 inches (about 106.7 cm) and the edge from left to right could have a length of about 13.5 inches (about 39.3 cm). Allowing for this larger illuminated area, compared to a regular traffic light, increases the distance that the light can be acquired by a driver and the size of the lit area should help increase safety.

The right side 20 view of FIG. 2 shows housing 12 having a fairing 26 with a depth of about 2 inches (about 5 cm). The fairing 26 provides protection from the elements. FIG. 2 also shows the rest of the housing 12 having a depth of about 6 inches (about 15.25 cm). Also shown is bottom 16 and back 24. Clearly, the LED traffic signal 10 can be made with any desired dimensions.

The LED traffic signal 10 can be powered by external wired power or solar power and, as shown in FIG. 2, have battery backup power, shown with battery back-up access 28. The circuit board possible location is also shown in FIG. 2, identified as circuit board access 29. The circuit board will determine what energy is applied to the various LEDs in the LED matrix, which determines the color(s) displayed on the LED matrix. When a LED is not powered, it appears as a fourth color 4.

FIG. 1A shows the LED matrix as it will appear to indicate stop. The entire LED matrix will be lit a first color 1. In the embodiment shown in FIG. 1A, the first color 1 is red. However, the first color 1 may be any color, including, but not limited to, scarlet, crimson, vermilion, or blue. FIG. 1B shows the LED matrix as it will appear to indicate caution. There will be a pair of second color 2 lit areas, each about 17 inches (about 43.2 cm) tall and 13.5 inches wide (about 39.3 cm), with a fourth color 4 unlit area between them of about 8 inches tall (about 20.3 cm) and 13.5 inches wide (about 39.3 cm). In the embodiment shown in FIG. 1B, the second color 2 is yellow and the fourth color 4 is black. However, the second color 2 may be any color, including but not limited to, amber, canary, citrine, or blue. The fourth color 4 may be any color, including but not limited to, black, brown, blue, navy, or aubergine. FIG. 1C shows the LED matrix as it will appear to indicate go. There will be three third color 3 lit areas, each about 11.33 inches (about 28.8 cm) tall and 13.5 inches wide (about 39.3 cm), with a fourth color 4 unlit area between each of the third color 3 areas of about 4 inches tall (about 10.2 cm) and 13.5 inches wide (about 39.3 cm). In the embodiment shown in FIG. 1C, the third color 3 is green and the fourth color 4 is black. However, the third color 3 may be any color, including, but not limited to, sage, mint, emerald, or blue. Drivers will see three lit areas for go, two lit areas for caution, and one large lit area for stop. Even if a color blind driver can not determine the colors displayed, the different patterns for go, caution, and stop will allow the color blind driver to know what action to take at the traffic signal.

Clearly, the dimensions of the third color 3, second color 2, or first color 1 areas and the dimensions of their associated fourth color 4 areas can be changed and still perform the same function. Also, the number of lit areas, 1 for stop, 2 for caution, and 3 for go, can be changed and still perform the same function. Further, different patterns other than rectangles can be shown in the lit or fourth color areas. For example, FIG. 3 shows an alternative display to that shown in FIG. 1C. There, instead of the three third color 3 lit areas, each about 11.33 inches (about 28.8 cm) tall and 13.5 inches wide (about 39.3 cm), with a fourth color 4 unlit area between each of the third color 3 areas of about 4 inches tall (about 10.2 cm) and 13.5 inches wide (about 39.3 cm) shown in FIG. 1C, the third color 3 lit areas at top and bottom remain the same (each about 11.33 inches (about 28.8 cm) tall and 13.5 inches wide (about 39.3 cm), but the center display is changed. The center area of about 19.33 inches (about 49.1 cm) tall and 13.5 inches wide (about 39.3 cm) is a fourth color 4 except for a third color 3 lit circle at its center, the circle having a diameter of about 10.75 inches (about 27.3 cm).

FIGS. 4A, 4B, 4C, and 4D show the faces 11 of an ancillary LED turn lights 10. Housing 12 is shown with top 14 and left side 18. It is envisioned that the housing 12 for the turn light LED display will have approximately the same dimensions as the housing for the LED traffic light explained above. While an ancillary LED turn light indicator could be placed elsewhere, one may be placed to the left of a LED traffic light to control left turns and another to the right of a LED traffic light to control right turns. Alternatively, a single LED turn light indicator could be used to control both left and right turns.

Figure 4A:
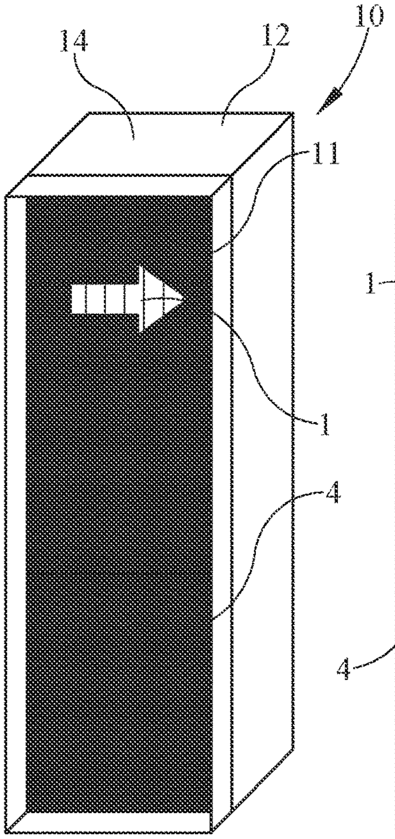
FIG. 4A depicts the face of an ancillary LED turn light indicating a first color no right turn allowed arrow. In the embodiment shown in FIG. 4A, the first color is red.
Figure 4B:
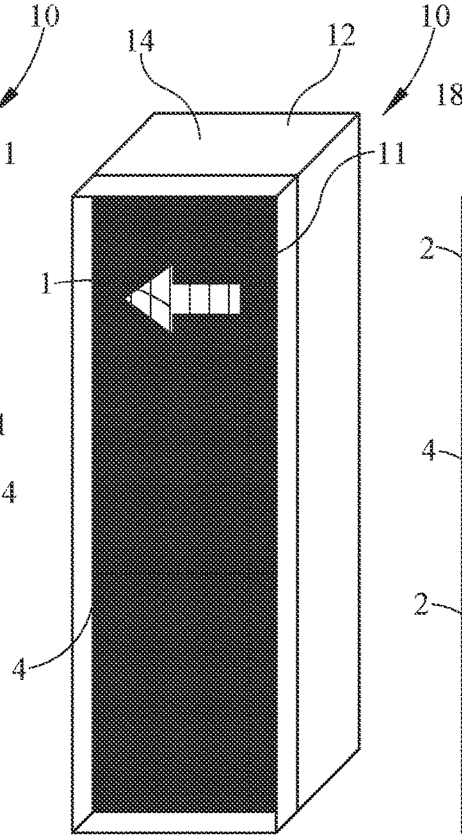
FIG. 4B depicts the face of an ancillary LED turn light indicating a first color no left turn allowed arrow. In the embodiment shown in FIG. 4B, the first color is red.
Figure 4C:
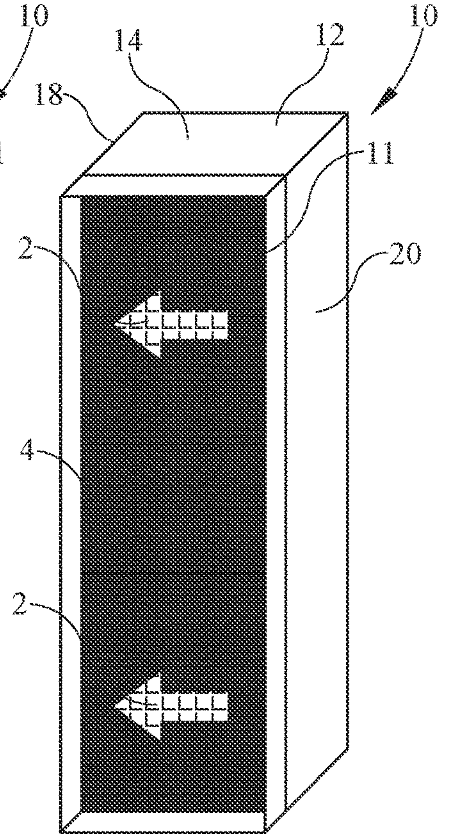
FIG. 4C depicts the face of an ancillary LED turn light indicating a second color turn allowed with caution arrows. In the embodiment shown in FIG. 4C, the second color is yellow.
Figure 4D:
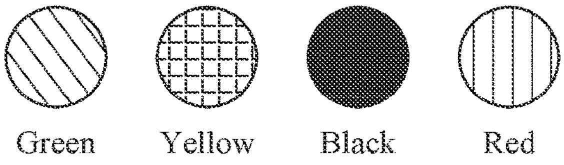
FIG. 4D depicts the face of an ancillary LED turn light indicating a third color turn allowed arrows. In the embodiment shown in FIG. 4D, the third color is green.
Figure 4D:
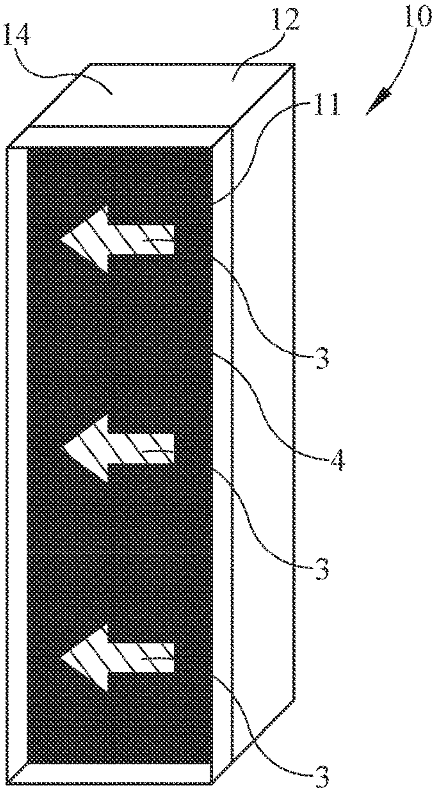

FIG. 4A shows a turn light indicator for no right turn and FIG. 4B shows a turn light indicator for no left turn. As shown, the entire LED matrix display is unlit (fourth color 4) except for a single first color 1 arrow toward the top of the display. In the embodiment shown in FIGS. 4A and 4B, the first color 1 is red and the fourth color 4 is black. FIG. 4C shows a turn light indicator for turn left with caution. The entire LED matrix display is unlit (fourth color 4) except for a second color 2 arrow toward the top of the display and another second color 2 arrow toward the bottom of the display. In the embodiment depicted in FIG. 4C, the second color 2 is yellow and the fourth color 4 is black. FIG. 4D shows a turn indicator indicating that it is permitted to turn left. The entire LED matrix display is unlit (fourth color 4) except for a third color 3 arrow toward the top of the display, another third color 3 arrow toward the bottom of the display, and a third color 3 arrow toward the center of the display. In the embodiment depicted in FIG. 4D, the third color 3 is green and the fourth color 4 is black. This turn system uses a single arrow for stop, two arrows for caution, and 3 arrows for go. This corresponds to the 1 rectangle for a first color, 2 rectangles for a second color, and 3 rectangles for a third color with the LED traffic light. To provide more emphasis for drivers, any or all of the arrows could flash on and off.

In certain embodiments, the first color 1, second color 2, third color 3, and fourth color 4 are not identical colors and are readily visually distinguishable from each other by a person of average or below-average visual acuity.

The foregoing detailed description is given primarily for clearness of understanding and no unnecessary limitations are to be understood therefrom for modifications can be made by those skilled in the art upon reading this disclosure and may be made without departing from the spirit of the invention.

The invention claimed is:

1. A LED traffic light system, comprising: a first LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for a driver to take from viewing the LED matrix, where a first indication of what action is permitted displayed on the LED matrix of the first LED traffic light is to activate all of the LEDs in the LED matrix to display a first color; where a second indication of what action is permitted is to activate LEDs in the upper and lower portions of the LED matrix to display a second color, there being an area in the center of the LED matrix where the LEDs are unlit thereby showing a fourth color area between the second color upper and lower portions; and where a third indication of what action is permitted is to activate LEDs in the upper, middle, and lower portions of the LED matrix to display a third color, there being an area between each of the third color upper, middle, and lower portions where the LEDs therein are unlit, that area showing as a fourth color area.

2. The LED traffic light system of claim 1, where the first color area in the first indication, the second color areas in the second indication, and the third color areas in the third indication each appear with a rectangular shape, and where the fourth color area between the second color areas in the second indication and the fourth color areas between the third color areas in the third indication appear with a rectangular shape.

3. The LED traffic light system of claim 1, where the first color area in the first indication, the second color areas in the second indication, and the upper and lower third color areas in the third indication each appear with a rectangular shape and the middle third color area in the third indication appears with a circular shape, and where the fourth color area between the second color areas in the second indication appear with a rectangular shape.

4. A LED traffic light system, comprising: a first LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for a driver to take from viewing the LED matrix, where a first indication of what action is permitted is to activate LEDs toward the top of the LED matrix to display a single arrow in a first color, the first color arrow indicating no turn permitted in the direction the arrow points, the remainder of the LEDs in the LED matrix being unlit; where a second indication of what action is permitted is to activate LEDs toward the top of the LED matrix to display two arrows in a second color, the second color arrows indicating turn permitted using caution in the direction the arrows point, the remainder of the LEDs in the LED matrix being unlit; and where a third indication of what action is permitted is to activate LEDs toward the top, middle, and bottom of the LED matrix to display three arrows in a third color, the third color arrows indicating turn permitted in the direction the arrows point, the remainder of the LEDs in the LED matrix being unlit.

5. The LED traffic light system of claim 1, where the programmable circuit board connected to a power source can be connected to power external to the housing or to battery back-up power should external power fail.

6. The LED traffic light system of claim 1, further comprising a second LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for the driver to take from viewing the LED matrix, where a first indication of what action is permitted displayed on the LED matrix of the second LED traffic light is to activate LEDs toward the top of the LED matrix to display a single arrow in the first color, the first color arrow indicating no turn permitted in the direction the arrow points, the remainder of the LEDs in the LED matrix being unlit; where a second indication of what action is permitted is to activate LEDs toward the top of the LED matrix to display two arrows in the second color, the second color arrows indicating turn permitted using caution in the direction the arrows point, the remainder of the LEDs in the LED matrix being unlit; and where a third indication of what action is permitted is to activate LEDs toward the top, middle, and bottom of the LED matrix to display three arrows in the third color, the third color arrows indicating turn permitted in the direction the arrows point, the remainder of the LEDs in the LED matrix being unlit.

7. The LED traffic light system of claim 6 where the indication of what action is permitted for the driver to take from viewing the LED matrix displayed on the first LED traffic light and the indication of what action is permitted for the driver to take from viewing the LED matrix displayed on the second LED traffic light are synchronized.

* * * * *